April 11, 1961           J. E. JESSEE           2,978,883
APPARATUS FOR CONVEYING PRODUCTS OVER A FROZEN SURFACE
Filed Aug. 22, 1956           2 Sheets-Sheet 1
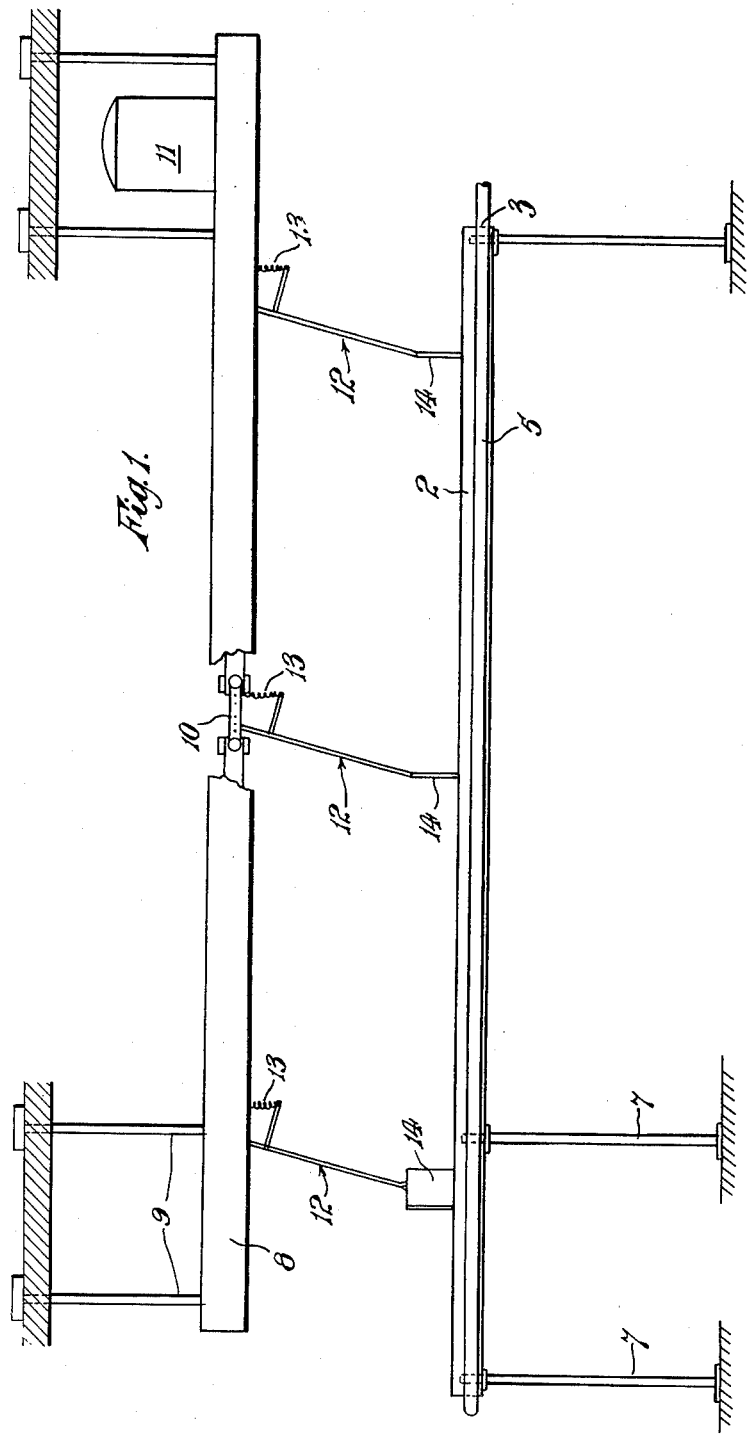

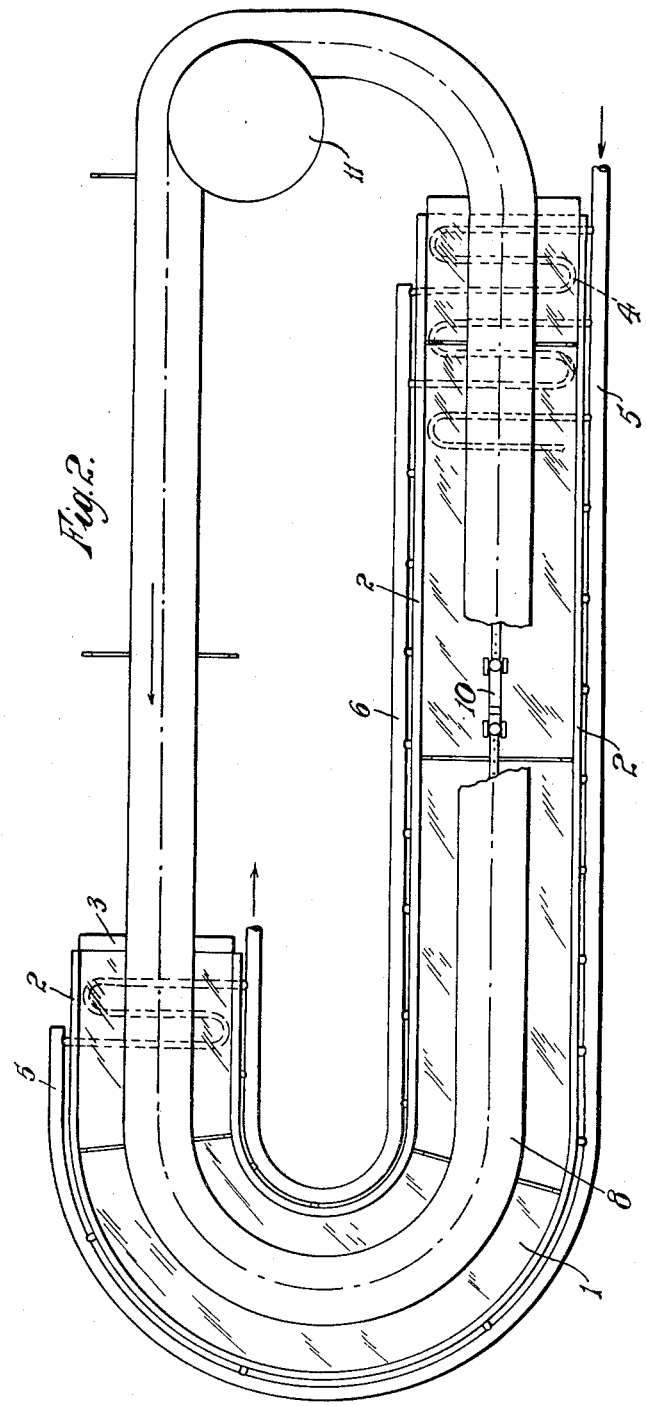

2,978,883

APPARATUS FOR CONVEYING PRODUCTS OVER A FROZEN SURFACE

Jan Evert Jessee, Oss, Netherlands, assignor to Lever Brothers Company, New York, N.Y., a corporation of Maine Filed Aug. 22, 1956, Ser. No. 605,587

Claims priority, application Netherlands Aug. 31, 1955

5 Claims. (Cl. 62—381)

This invention relates to methods of and apparatus for conveying perishable articles. The invention has particular but not exclusive application to the conveying of perishable foodstuffs such as, for example, meat or fish past a number of operating stations.

It is essential that such conveying be carried out under the most hygienic conditions and that the condition of the articles does not deteriorate substantially during the conveying process.

It is an object of the present invention to provide a new and improved method of, and apparatus for conveying perishable articles in which the above mentioned requirements are substantially attained.

According to the present invention a method of conveying perishable articles comprises the steps of producing a hard, smooth, planar surface by freezing a liquid, supporting said articles on the surface thus formed and causing said articles to move over said surface.

According to an aspect of the invention, apparatus for carrying out said method comprises a trough-like container adapted to contain a liquid, cooling means for freezing said liquid in said container so as to produce a hard, smooth, planar surface in the mouth of the container, means for placing said articles on said surface and conveying means for moving said articles over said surface.

Preferably said liquid consists of water, whilst said conveying means comprises a conveyor provided with one or more entraining members adapted upon motion of said conveyor to move over the mouth of the container.

One arrangement in accordance with the present invention will now be described by way of example with reference to the accompanying drawings in which:

Fig. 1 is a side elevation of a conveying apparatus, and

Fig. 2 is a plan view of said apparatus.

Referring to the drawings the apparatus includes a curved shallow tank 1 bounded by a pair of side walls 2 and by a pair of end walls 3. The tank 1 is provided with a plurality of cooling pipes 4 connected to coolant supply and removal pipes 5 and 6. The tank 1 is supported upon the ground by a plurality of supporting members 7.

A conveying mechanism 8 curved similarly to the tank 1 and suspended by means of suspending members 9 from above comprises a continuous belt formed of a plurality of interconnected hinged elements 10 the belt being driven by a driving member 11. To each of the elements 10 is attached an arm 12 which is spring loaded by means of a spring 13 so that a wider lower end 14 of the arm 12 is resiliently pressed against an ice surface which is formed in the tank 1.

In operation the tank 1 is filled with water and the coolant is caused to circulate in the cooling pipes 4 so as to freeze the water, the frozen surface of the water being coplanar with the edges of the end walls 3 of the tank 1 but lower than the edges of the side walls 2 of the tank 1. The articles to be conveyed (not shown) are deposited on the surface of the ice at one end of the tank 1 and the driving member 11 causes the conveyor 8 to move thereby causing the widened ends 14 of the arms 12 to move over the ice in the direction of motion of the conveyor 8 and past a plurality of processing points (not shown). The articles are thus caused to arrive at a remote end of the tank 1 and are automatically removed by means not shown in the drawings.

It will be appreciated that the present invention provides a surface over which the articles may be conveyed which is smooth and continuous and devoid of joints or seams thus facilitating the cleaning of the surface and also substantially reducing the possibility of the accumulation of bacteria producing matter. Furthermore, the surface itself may be easily and economically renewed at frequent intervals by merely liquifying the ice and renewing the water in the tank. Thus any damage done to the surface such as for example denting by heavy or sharp articles may be easily made good without the necessity, as in hitherto proposed arrangements of costly and elaborate replacements. The use of an ice surface will of course be effective in cooling the articles whilst they are being conveyed thus substantially reducing any deterioration in the condition of the articles during the conveying process.

Whilst the present invention has been specifically described as employing an ice surface, other suitable liquids may equally well be used to provide on freezing a suitable hard surface. Furthermore, the means employed to move the articles over the surface are not restricted to those specifically described in the above description other means may be employed such as, for example, a vibratory system in which the tank itself is caused to vibrate thereby imparting a vibratory motion to the articles in a specified direction.

I claim:

1. Apparatus for conveying perishable articles comprising a trough-like container adapted to contain a liquid cooling means for freezing said liquid in said container so as to produce a hard, smooth, planar surface in the mouth of the container and a conveyor for moving said articles over said surface and provided with one or more entraining members adapted upon motion of the conveyor to move over the mouth of the container so as to press resiliently against the hard surface which is adapted to be formed.

2. Apparatus according to claim 1 in which said container is provided with a pair of side walls and a pair of end walls transverse to said side walls and to the direction of motion of said members, said end walls having a height not greater than the height of said side walls.

3. Apparatus for conveying perishable articles comprising a trough-like container adapted to contain a liquid cooling means for freezing said liquid in said container so as to produce a hard, smooth, planar surface in the mouth of the container and a conveyor for moving said articles over said surface and provided with one or more entraining members adapted upon motion of the conveyor to move over the mouth of the container so as to press resiliently against the hard surface which is adapted to be formed, said container being provided with a pair of side walls and a pair of end walls transverse to said side walls and to the direction of motion of said members said end walls having a height not greater than the height of said side walls.

4. Apparatus for conveying perishable articles while preserving them from deterioration which comprises a trough for containing a liquid to be frozen, means for freezing a liquid in said trough and conveyor means for continually moving articles fed on to the surface of the frozen liquid along said surface and arranged to engage the surface of the frozen liquid with sufficient pressure to maintain the surface in a clean, smooth condition.

5. Apparatus for conveying perishable articles while preserving them from deterioration which comprises a trough for containing a liquid to be frozen, means for freezing a liquid in said trough, a scraper-conveyor mounted above the trough and having downwardly depending blades pivotally mounted and spring loaded so as to press down on the surface of the frozen liquid while sweeping the articles along said surface.

References Cited in the file of this patent

UNITED STATES PATENTS

| | | |
|---|---|---|
| 587,840 | Martin | Aug. 10, 1897 |
| 600,749 | Louis | Mar. 15, 1898 |
| 760,455 | Hornblower | May 24, 1904 |
| 2,053,540 | Stoneman | Sept. 8, 1936 |
| 2,213,206 | Culver | Sept. 3, 1940 |
| 2,282,899 | Snader et al. | May 12, 1942 |
| 2,318,736 | Birdseye | May 11, 1943 |
| 2,371,396 | Knowles | Mar. 13, 1945 |
| 2,385,247 | Yeomans | Sept. 18, 1945 |
| 2,642,679 | Zamboni | June 23, 1953 |